US012152723B2

(12) United States Patent
He

(10) Patent No.: US 12,152,723 B2
(45) Date of Patent: Nov. 26, 2024

(54) FOLDABLE HOLDER FOR PORTABLE ELECTRONIC DEVICE

(71) Applicant: Shangxing Technology (shenzhen) Co., Ltd., Shenzhen (CN)

(72) Inventor: Shuwei He, Changsha (CN)

( * ) Notice: Subject to any disclaimer, the term of this patent is extended or adjusted under 35 U.S.C. 154(b) by 0 days.

(21) Appl. No.: 18/590,565

(22) Filed: Feb. 28, 2024

(65) Prior Publication Data

US 2024/0328569 A1    Oct. 3, 2024

(30) Foreign Application Priority Data

Mar. 28, 2023    (CN) .......................... 202320697399.8

(51) Int. Cl.
| | | |
|---|---|---|
| *H01M 10/46* | (2006.01) | |
| *F16M 11/10* | (2006.01) | |
| *F16M 11/38* | (2006.01) | |
| *H02J 50/10* | (2016.01) | |
| *H02J 50/40* | (2016.01) | |

(52) U.S. Cl.
CPC ............. *F16M 11/10* (2013.01); *F16M 11/38* (2013.01); *H02J 50/10* (2016.02); *H02J 50/402* (2020.01)

(58) Field of Classification Search
CPC ........ H02J 7/0042; H02J 50/10; H02J 50/005; H02J 50/402; F16M 11/38; F16M 11/10
USPC ................................ 320/107, 108, 114, 115
See application file for complete search history.

(56) References Cited

U.S. PATENT DOCUMENTS

| | | | | |
|---|---|---|---|---|
| 11,936,224 | B1 * | 3/2024 | He | H02J 7/0044 |
| 2022/0263931 | A1 * | 8/2022 | Ma | H04M 1/022 |

FOREIGN PATENT DOCUMENTS

| | | | | |
|---|---|---|---|---|
| CN | 103701179 | A | * | 4/2014 |
| CN | 114465368 | A | * | 5/2022 |

OTHER PUBLICATIONS

Machine translate CN103701179-A (Apr. 2, 2014) (Year: 2014).*

* cited by examiner

*Primary Examiner* — Edward Tso

(57) ABSTRACT

A foldable holder for a portable electronic device, including multiple support members, and a pivot member for pivoting each adjacent two support members. Each support member includes a plate body; each of at least two support members further includes a wireless charging device disposed in a corresponding plate body. The pivot member is arranged with a first pivot structure and a second pivot structure, a pivot axis of the first pivot structure being offset with respect to a pivot axis of the second pivot structure. In a structure in which the pivot member is pivoted to adjacent two plate bodies, the first pivot structure is pivoted to one of the adjacent two plate bodies, and the second pivot structure is pivoted to the other of the adjacent two plate bodies; the foldable holder is capable of being in a bent support state or a laying support state.

9 Claims, 17 Drawing Sheets

FOLDABLE HOLDER FOR PORTABLE ELECTRONIC DEVICE

CROSS REFERENCE

The present disclosure claims priority of Chinese Patent Application No. 202320697399.8, filed on Mar. 28, 2023, the entire contents of which are hereby incorporated by reference in their entirety.

TECHNICAL FIELD

The present disclosure relates to technical field of holders for electronic devices, and more specifically to a foldable holder for a portable electronic device.

BACKGROUND

A Foldable holder is characterized by being easily stored and organized and therefore has become a mainstream product of holders for portable electronic devices. In common scenarios, a person often uses more than one portable electronic devices, such as a smartphone, a smartwatch, wireless charging earphones, etc. If more than two portable electronic devices can be charged at the same time, the convenience of use can be enhanced. For example, Chinese Patent Publication No. CN218569918U, entitled "Foldable wireless charging holder", discloses such a holder that combines convenient storage and multi-device charging functions. However, this kind of holder is difficult to support a tablet computer with a larger shape when the holder is in a folded state. Further, when the holder is being folded to a horizontal laying state, there will be interference between two adjacent charging modules, resulting in the holder not being able to be completely flattened. Therefore, the holder is also difficult to charge small electronic devices and large electronic devices in the laying state.

SUMMARY OF THE DISCLOSURE

In view of the above problems, the present disclosure proposes a foldable holder for a portable electronic device, aiming at solving the technical problem that the existing foldable holder cannot charge electronic devices with larger shapes.

In order to realize the above purpose, the present disclosure provides a foldable holder for a portable electronic device, comprising a plurality of support members, and a pivot member arranged between each adjacent two of the plurality of support members for pivoting the adjacent two of the plurality of support members;

wherein each of the plurality of support members comprises a plate body; each of at least two of the plurality of support members further comprises a wireless charging device disposed in a corresponding plate body;
the pivot member is arranged with a first pivot structure and a second pivot structure, a pivot axis of the first pivot structure being offset with respect to a pivot axis of the second pivot structure; in a structure in which the pivot member is pivoted to adjacent two the plate bodies, the first pivot structure is pivoted to one of the adjacent two plate bodies, and the second pivot structure is pivoted to the other of the adjacent two plate bodies;
the foldable holder is capable of being in a bent support state or a laying support state; in the bent support state, each adjacent two the plate bodies are arranged at an angle; in the laying support state, all the plate bodies are spliced transversally, wherein upper surfaces of the plate bodies are flush with each other, and lower surfaces of the plate bodies are flush with each other.

In some embodiments, the first pivot structure comprises a first pivot surface and a third pivot surface, and the second pivot structure comprises a second pivot surface and a fourth pivot surface; the first pivot surface and the second pivot surface are disposed on an end of the pivot member, and the third pivot surface and the fourth pivot surface are disposed on another end of the pivot member;
the third pivot surface is coaxial with the first pivot surface, and the fourth pivot surface is coaxial with the second pivot surface; the first pivot surface and the third pivot surface are pivoted to one of the adjacent two plate bodies, and the second pivot surface and the fourth pivot surface are pivoted to the other of the adjacent two plate bodies.

In some embodiments, the plate body comprises a front surface and a back surface that are backed away from each other and a side surface that is disposed between the front surface and the back surface; the side surfaces of each adjacent two the plate bodies are disposed in close proximity to each other; the side surface of the plate body defines a pivot slot, and is formed with a first pivot portion disposed on a side of the pivot slot and a second pivot portion disposed on another side of the pivot slot; the second pivot portion defines a first wire-through hole in communication with an inner cavity of the plate body;
in the structure in which the pivot member is pivoted to the adjacent two plate bodies:
the first pivot surface is pivoted to the first pivot portion of one of the adjacent two plate bodies, and the third pivot surface is pivoted to the first wire-through hole of the one of the adjacent two plate bodies; and
the second pivot surface is pivoted to the first pivot portion of the other of the adjacent two plate bodies, and the fourth pivot surface is pivoted to the first wire-through hole of the other of the adjacent two plate bodies;
the pivot member further comprises a main body and a side cover; an end of the main body is arranged with the first pivot surface and the second pivot surface, and another end of the main body defines a wire-through groove; the side cover is fixedly capped to the wire-through groove, and a side of the side cover back from the main body is arranged with the third pivot surface and the fourth pivot surface; a portion on the side cover enclosed by each of the third pivot surface and the fourth pivot surface defines a second wire-through hole in communication with the wire-through groove;
the foldable holder further comprises an electrical connection cable, the electrical connection cable being connected to a corresponding wireless charging device through the first wire-through hole, the wire-through groove, and the second wire-through hole.

In some embodiments, the plate body further comprises a top shell, a bottom cover, and a pivot seat that is fixedly disposed on an inner side of the bottom cover; the top shell has an opening opened downwardly, and the bottom cover is fixedly capped to the opening of the top shell; the pivot slot comprises a recess arranged on an edge of the top shell, and a notch arranged on an edge of the bottom cover; the first wire-through hole comprises a first half groove on a side wall of the recess, and a second half groove on the pivot seat.

In some embodiments, an inner surface of the bottom cover of the plate body at an upward position in the bent support state is arranged with a plurality of reinforcing bars, and the pivot seat is integrally molded with the bottom cover.

In some embodiments, the bottom cover of the plate body at a bottom position in the bent support state is a flat plate, and the pivot seat and the bottom cover are of a separate structure.

In some embodiments, an annular positioning groove is defined at an outer entrance of the wire-through groove; the side cover comprises a cover plate and two pivoting cylinders, the two pivoting cylinders protruding from an outer side of the cover plate; the second pivoting surface and the fourth pivoting surface are each formed on an outer peripheral surface of a corresponding one of the two pivoting cylinders; an edge portion of the cover plate is embedded in the positioning groove, and the two pivoting cylinders are each pivoted in the first wire-through hole of a corresponding one of the adjacent two plate bodies.

In some embodiments, each of the plurality of support members further comprises a pivot shaft extending from the first pivot portion toward the pivot slot; two shaft holes are defined on an end of the main body away from the side cover, the first pivot surface and the third pivot surface are each formed on an inner wall surface of a corresponding one of the two shaft holes, and the two shaft holes are socketed to the pivot shafts of the adjacent two of the plurality of support members, respectively; the pivot member further comprises a damping sleeve socketed on the pivot shaft and disposed between the pivot shaft and a corresponding shaft hole; in the bent support state, the plurality of support members are spread out in an up-down direction, and the damping sleeve is configured to make the adjacent two of the plurality of support members pivoted to each other at a fixed angle.

In some embodiments, the plate body comprises a top shell, a bottom cover, and a limit seat;

the top shell has an opening opened downwardly; a side wall of the top shell defines a via opposite to and openly provided with the first wire-through hole, and an inner wall surface of the top shell defines a limiting groove in a region adjacent to the via;

the bottom cover is fixedly capped to the opening of the top shell; the pivot slot defines a recess arranged on an edge of the top shell, and a notch arranged on an edge of the bottom cover;

the limit seat is fixedly disposed in the limiting groove; an end of the limit seat defines a fixing hole, the fixing hole being fixedly socketed to an end of the pivot shaft away from the first wire-through hole; the limit seat is in a form of an elongate strip, and a length direction of the limit seat is perpendicular to an axis of the pivot shaft.

In some embodiments, an outer peripheral surface of the end of the pivot shaft away from the first wire-through hole is arranged with a friction pattern, and the friction pattern extends along an axial direction of the pivot shaft and is spaced apart around the axis of the pivot shaft; the friction pattern has an interference fit with an inner wall of the fixing hole.

In the foldable holder for a portable electronic device as proposed in the present disclosure, the first pivot structure and the second pivot structure with pivot axes offset from each other are arranged on the pivot member, and the two pivot structures are connected to the plate bodies of adjacent two of the support members, respectively, such that the upper and lower surfaces of the respective plate bodies are flush respectively when the support members are spread out. In this way, the foldable holder in the laying support state can be extended underneath a larger-shaped electronic device and stably support the larger-shaped electronic device, thereby smoothly realizing wireless charging for the electronic device. When wireless charging is required for a relatively smaller-shaped electronic device, it is only necessary to unfold the foldable holder to the bent support state and place the electronic device onto a corresponding support surface.

BRIEF DESCRIPTION OF THE DRAWINGS

In order to more clearly illustrate the technical solutions in the embodiments of the present disclosure, the accompanying drawings to be used in the description of the embodiments will be briefly introduced below, and it will be obvious that the accompanying drawings in the following description are only some of the embodiments of the present disclosure, and that for those skilled in the art, other accompanying drawings can be obtained based on these drawings without putting in creative labor.

REFERENCE NUMERALS

Figure 1:
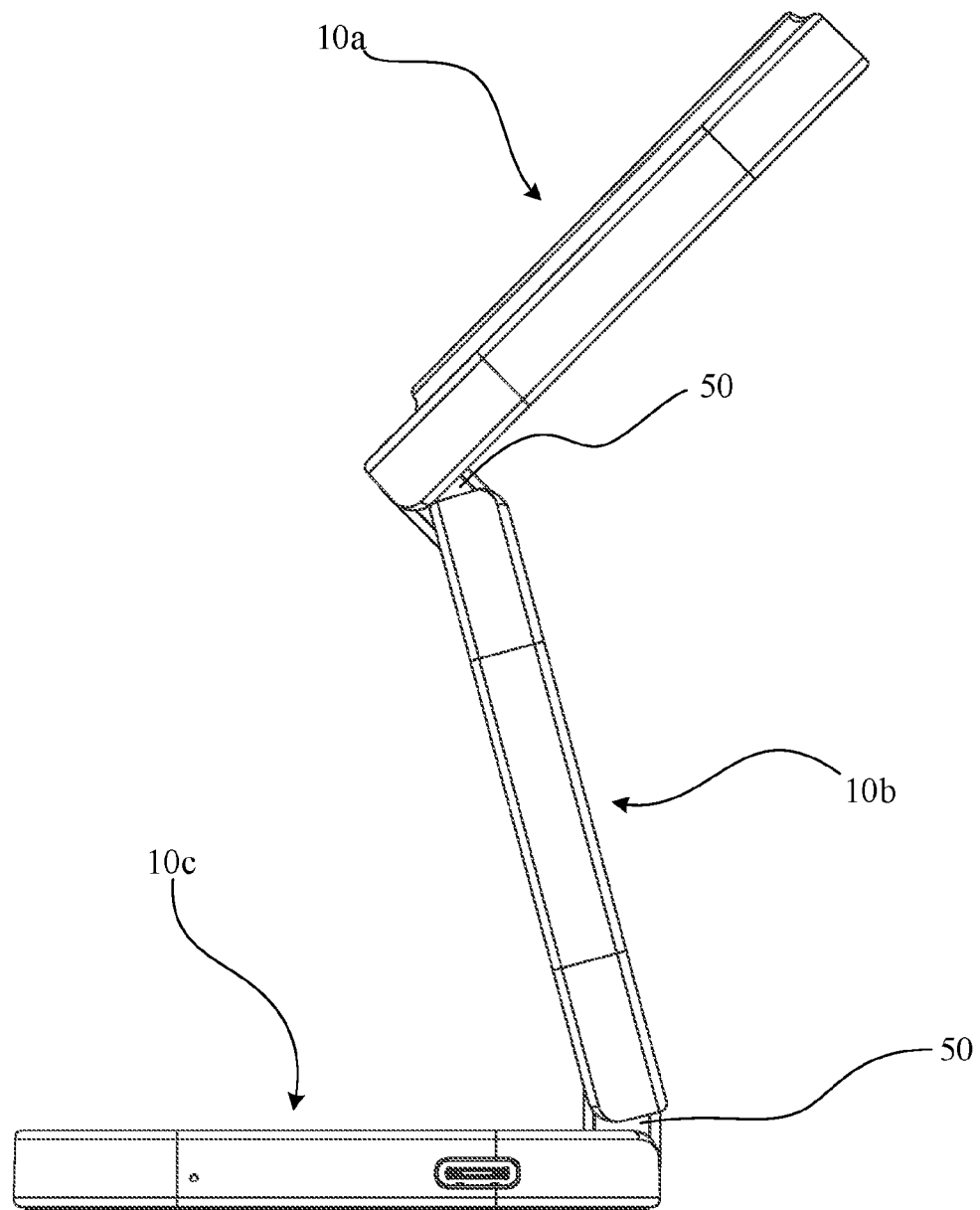
FIG. 1 is a side-view structural schematic diagram of a foldable holder for a portable electronic device, according to some embodiments of the present disclosure, in a bent support state.
Figure 2:
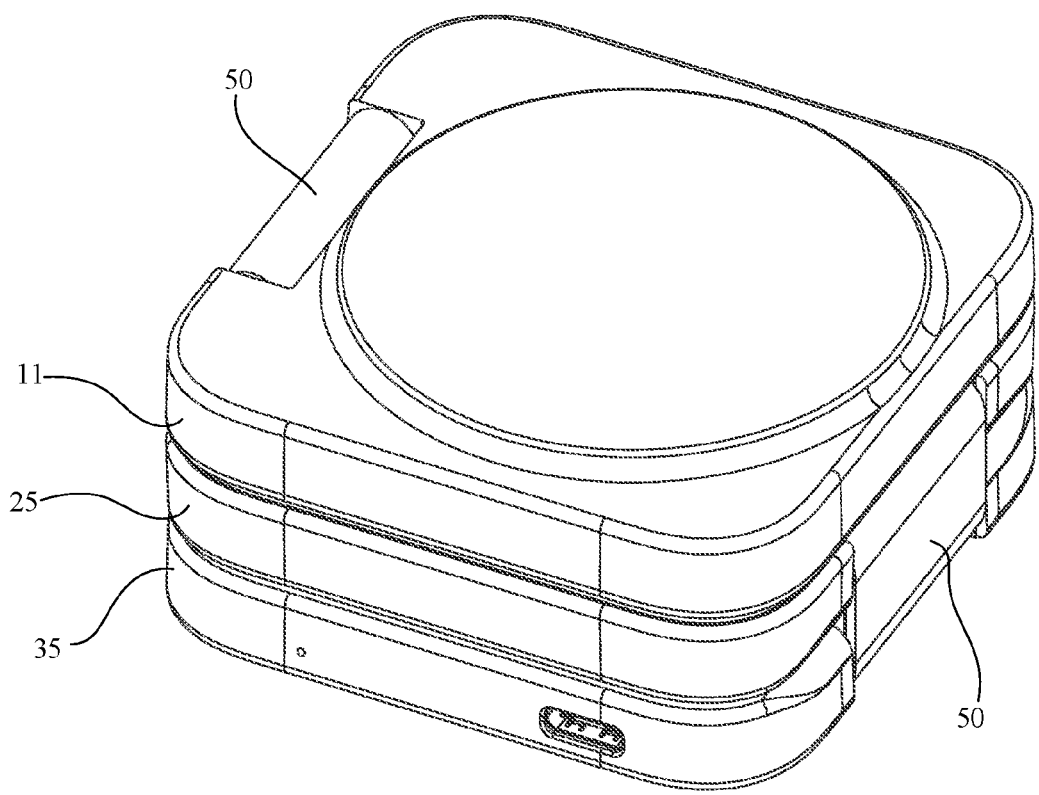
FIG. 2 is a perspective structural schematic diagram of the foldable holder for a portable electronic device in FIG. 1 in a folded and laminated state.
Figure 3:
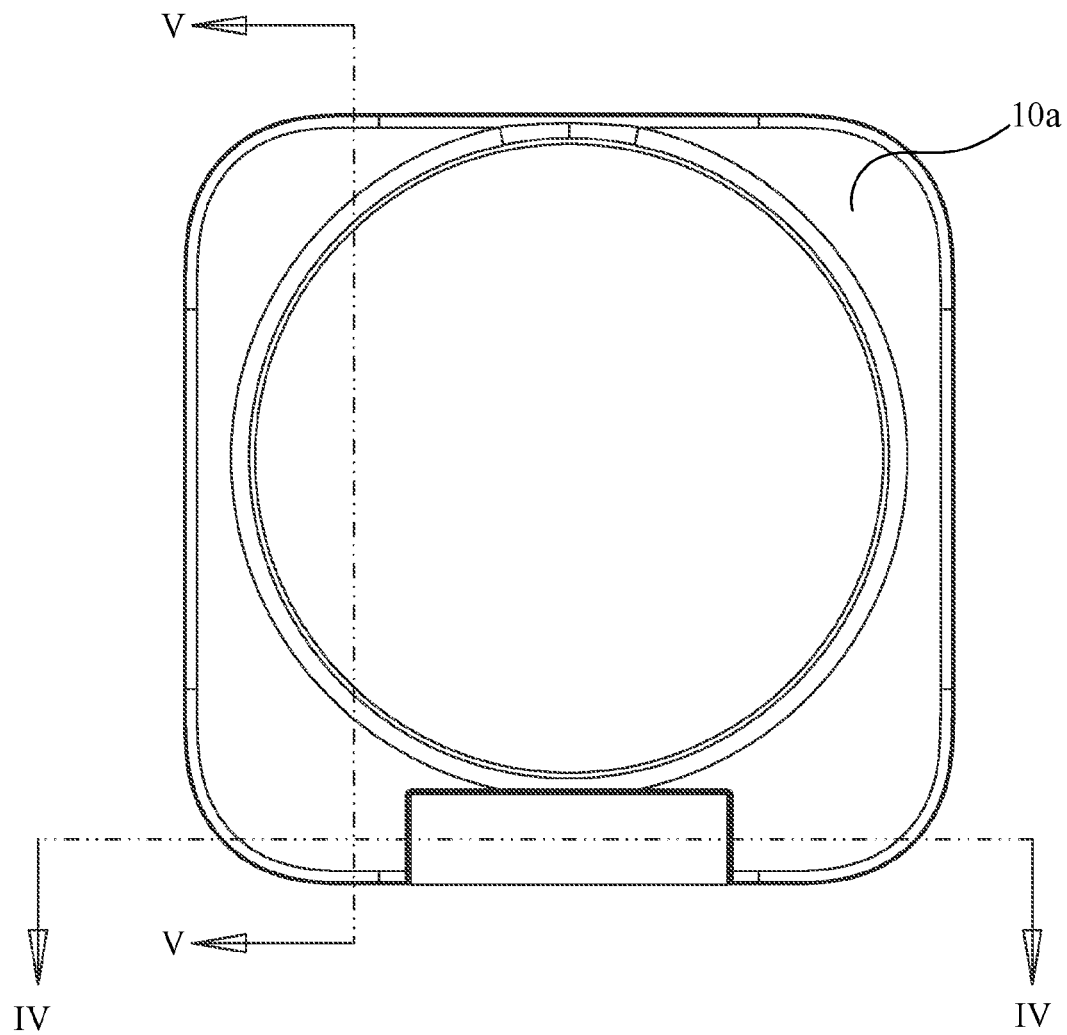
FIG. 3 is a top-view structural schematic diagram of the foldable holder for a portable electronic device in FIG. 2.

| No. | Name | No. | Name | No. | Name |
|---|---|---|---|---|---|
| 100 | Foldable holder | 21 | Limit seat | 50 | Pivot member |
| 10a | Support member | 22 | Fixing hole | 51 | First pivot structure |
| 11 | Plate body | 23 | Wireless charging device | 511 | First pivot surface |
| 12 | Pivot slot | 24 | Pivot shaft | 512 | Third pivot surface |
| 121 | Recess | 241 | Friction pattern | 52 | Second pivot structure |
| 122 | Notch | 10b | Support member | 521 | Second pivot surface |
| 13 | First pivot portion | 25 | Plate body | 522 | Fourth pivot surface |
| 14 | Second pivot portion | 26 | Top shell | 53 | Main body |
| 15 | First wire-through hole | 29 | Bottom cover | 54 | Wire-through groove |
| 151 | First half groove | 30 | Pivot seat | 55 | Positioning groove |
| 152 | Second half groove | 33 | Wireless charging device | 56 | Shaft hole |
| 16 | Top shell | 10c | Support member | 57 | Side cover |
| 17 | via | 35 | Plate body | 58 | Second wire-through hole |
| 18 | Limiting groove | 36 | Top shell | 59 | Cover plate |
| 19 | Bottom cover | 37 | Bottom cover | 60 | Pivot cylinder |
| 191 | Reinforcement bar | 40 | Pivot seat | 61 | Damping sleeve |
| 20 | Pivot seat | 43 | Wireless charging device | 70 | Electrical connection cable |

The realization of purpose, functional features, and advantages of the present disclosure will be further described in conjunction with the embodiments and with reference to the accompanying drawings.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without creative labor fall within the scope of the present disclosure. In addition, the technical solutions between various embodiments may be combined with each other, but it must be based on the fact that those skilled in the art are able to realize the same. When the combination of the technical solutions appears to be contradictory or unattainable, it should be considered that the combination of such technical solutions does not exist, and is not included in the scope claimed by the present disclosure.

It should be noted that when the embodiments of the present disclosure involve directional indications (such as up, down, left, right, forward, back . . . ), the directional indications are only intended to explain a relative positional relationship, movement, etc. between various components in a particular attitude. When the particular attitude changes, the directional indications are also changed accordingly.

In addition, when the embodiments of the present disclosure involve descriptions of "first", "second", etc., the descriptions of "first", "second", etc. are intended only for descriptive purposes, and are not to be construed as indicating or implying their relative importance or implicitly specifying the number of the indicated technical features. As a result, a feature defined as "first" or "second" may include at least one such feature either explicitly or implicitly. In addition, the meaning of "and/or" appearing throughout the text is to include three concurrent solutions. For example, "A and/or B" refers to a solution including A alone, B alone, and both A and B.

Referring to FIGS. 1 to 7, in some embodiments, the present disclosure provides a foldable holder 100 for a portable electronic device, including multiple support members 10a, 10b, 10c, and a pivot member 50 arranged between each adjacent two of the support members 10a, 10b, 10c, for pivoting the adjacent two of the support members 10a, 10b, 10c.

Each of the support members 10a, 10b, 10c includes a plate body 11, 25, 35. Each of at least two of the support members 10a, 10b, 10c further includes a wireless charging device 23, 33, 43 disposed in the plate body 11, 25, 35.

The pivot member 50 is arranged with a first pivot structure 51 and a second pivot structure 52, a pivot axis of the first pivot structure 51 being offset with respect to a pivot axis of the second pivot structure 52. In a structure in which the pivot member 50 is pivoted to two adjacent plate bodies 11, 25, 35, the first pivot structure 51 is pivoted to one of the plate bodies 11, 25, 35, and the second pivot structure 52 is pivoted to the other of the plate bodies 11, 25, 35.

The foldable holder 100 for a portable electronic device includes a bent support state and a laying support state. In the bent support state, each adjacent two plate bodies 11, 25, 35 are arranged at an angle. In the laying support state, the plate bodies 11, 25, 35 are spliced transversally, where upper surfaces of the plate bodies 11, 25, 35 are flush with each other, and lower surfaces of the plate bodies 11, 25, 35 are flush with each other.

Figure 17:
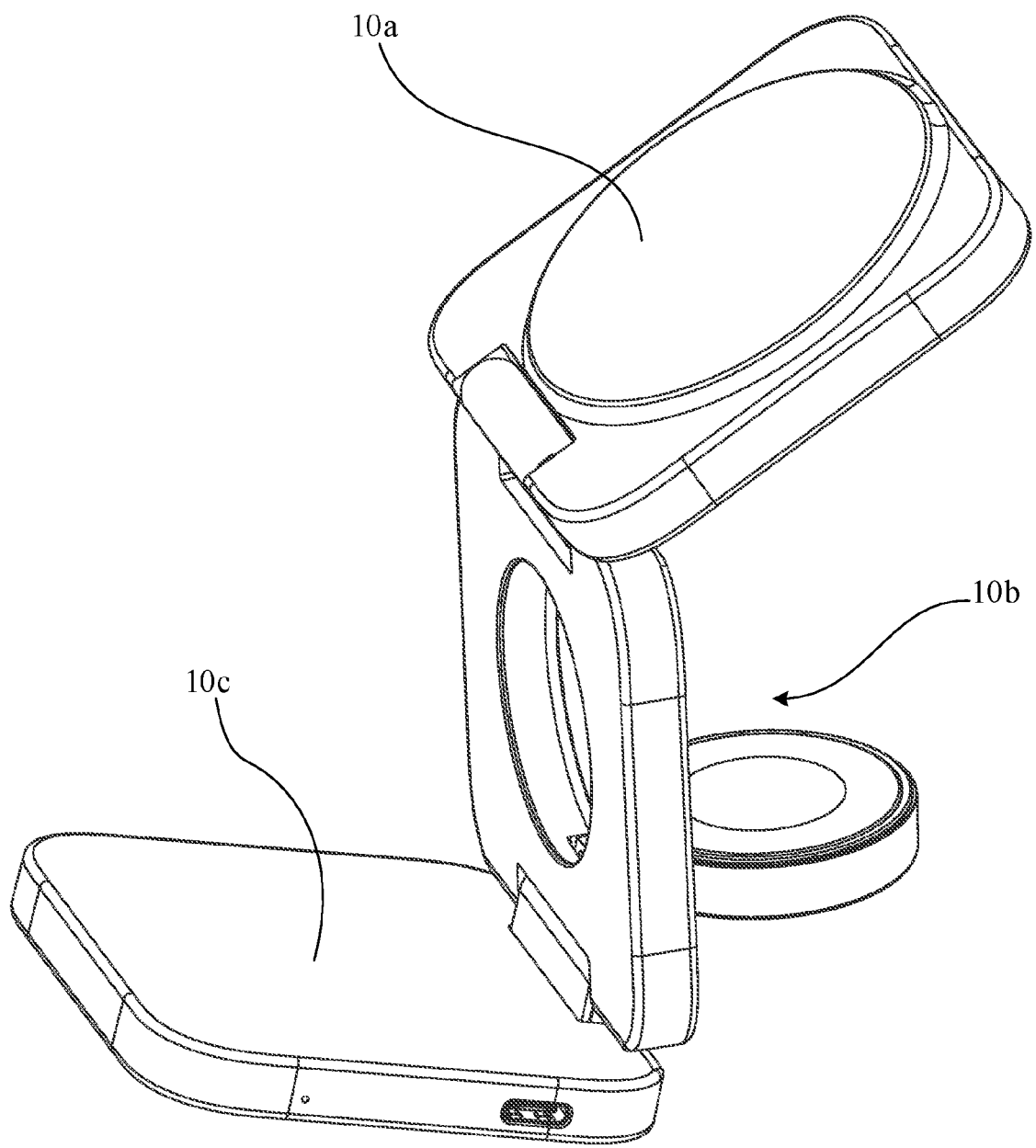
FIG. 17 is a perspective structural schematic diagram of the foldable holder for a portable electronic device in FIG. 1 in another bent support state.

In the illustrated embodiments, the foldable holder 100 for a portable electronic device has a total of three support members 10a, 10b, 10c. Among them, the support member 10a located in an uppermost part may be configured to support a mobile phone; the support member 10b located in a middle part may form a support platform with the corresponding charging module rotatable individually, as shown in FIG. 17, and the support platform may be configured to support a watch; the support member 10c located in a lowermost part is in contact with an external support surface, such as a desktop, and the support member 10c may be configured to support wireless charging earphones, such that the foldable holder 100 may simultaneously charge the mobile phone, watch, and wireless charging earphones.

In a variant embodiment, only two of the three support members 10a, 10b, 10c may be arranged with the wireless charging device 23, 33, 43, such as the upper support member 10a and the lower support member 10c; or the upper support member 10a and the middle support member 10b.

The plate body 11, 25, 35 is a structure having a relatively flat support surface, and the plate body 11, 25, 35 may be either solid or relatively hollowed out.

The wireless charging device 23, 33, 43 includes at least a wireless charging coil. In practice, a control circuit board may be arranged adjacent to the wireless charging coil or relatively far away from the wireless charging coil, and multiple wireless charging coils may share the same control circuit board.

The pivot member 50 may be pivoted unilaterally or bilaterally to the plate bodies 11, 25, 35; the pivot member 50 has two pivot axes, which may be set in parallel or at an angle, as long as the pivot member 50 can stably support the associated electronic device interface in the bent support state. The first pivot structure 51 or the second pivot structure 52 may each be a shaft or a hole, and correspondingly, the plate body 11, 25, 35 is arranged with a hole or a shaft.

In the foldable holder 100 for a portable electronic device as proposed in the present disclosure, the first pivot structure 51 and the second pivot structure 52 with pivot axes offset from each other are arranged on the pivot member 50, and the two pivot structures are connected to the plate bodies 11, 25, 35 of adjacent two of the support members 10a, 10b, 10c, respectively, such that the upper and lower surfaces of the respective plate bodies 11, 25, 35 are flush respectively when the support members 10a. 10b, 10c are spread out. In this way, the foldable holder 100 in the laying support state can be extended underneath a larger-shaped electronic device and stably support the larger-shaped electronic device, thereby smoothly realizing wireless charging for the electronic device. When wireless charging is required for a relatively smaller-shaped electronic device, it is only necessary to unfold the foldable holder 100 to the bent support state and place the electronic device onto a corresponding support surface.

Figure 8:
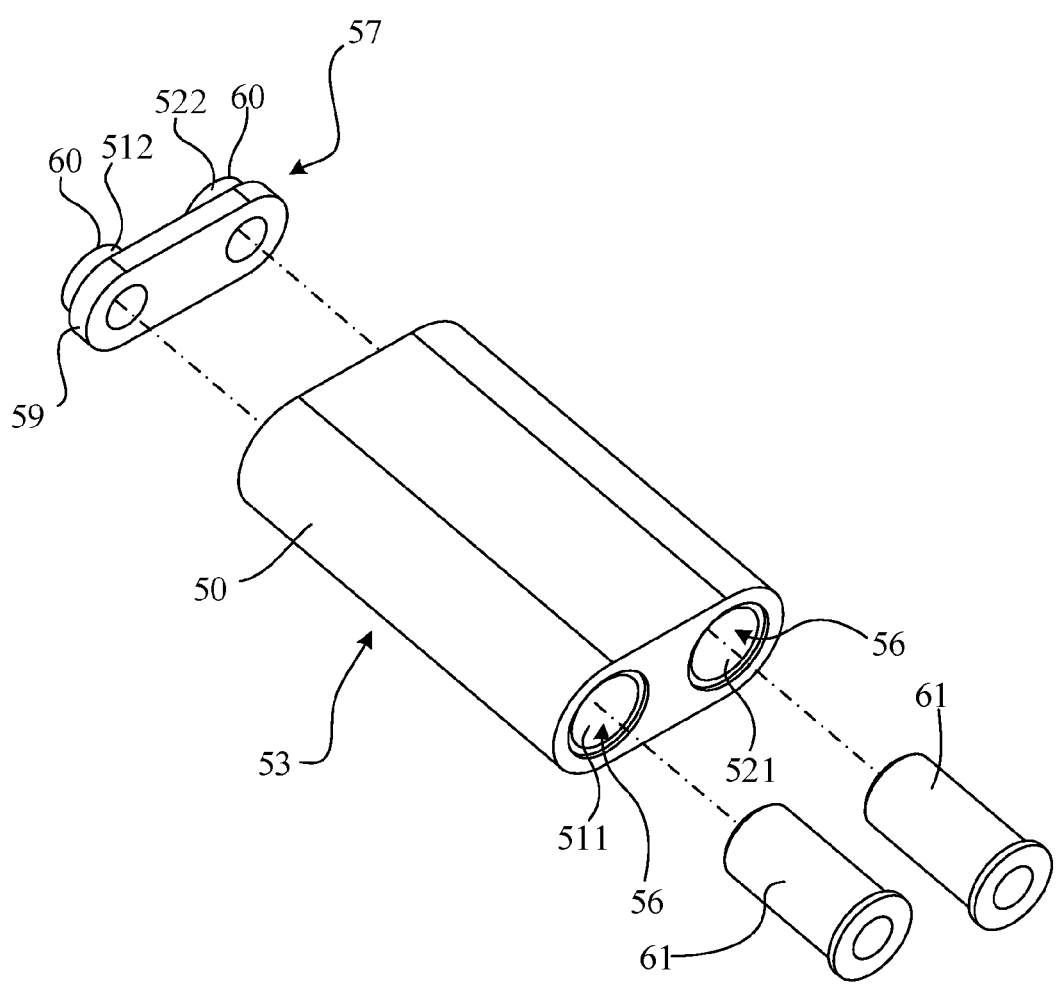
FIG. 8 is an exploded structural schematic diagram of a pivot member in FIG. 6.
Figure 9:
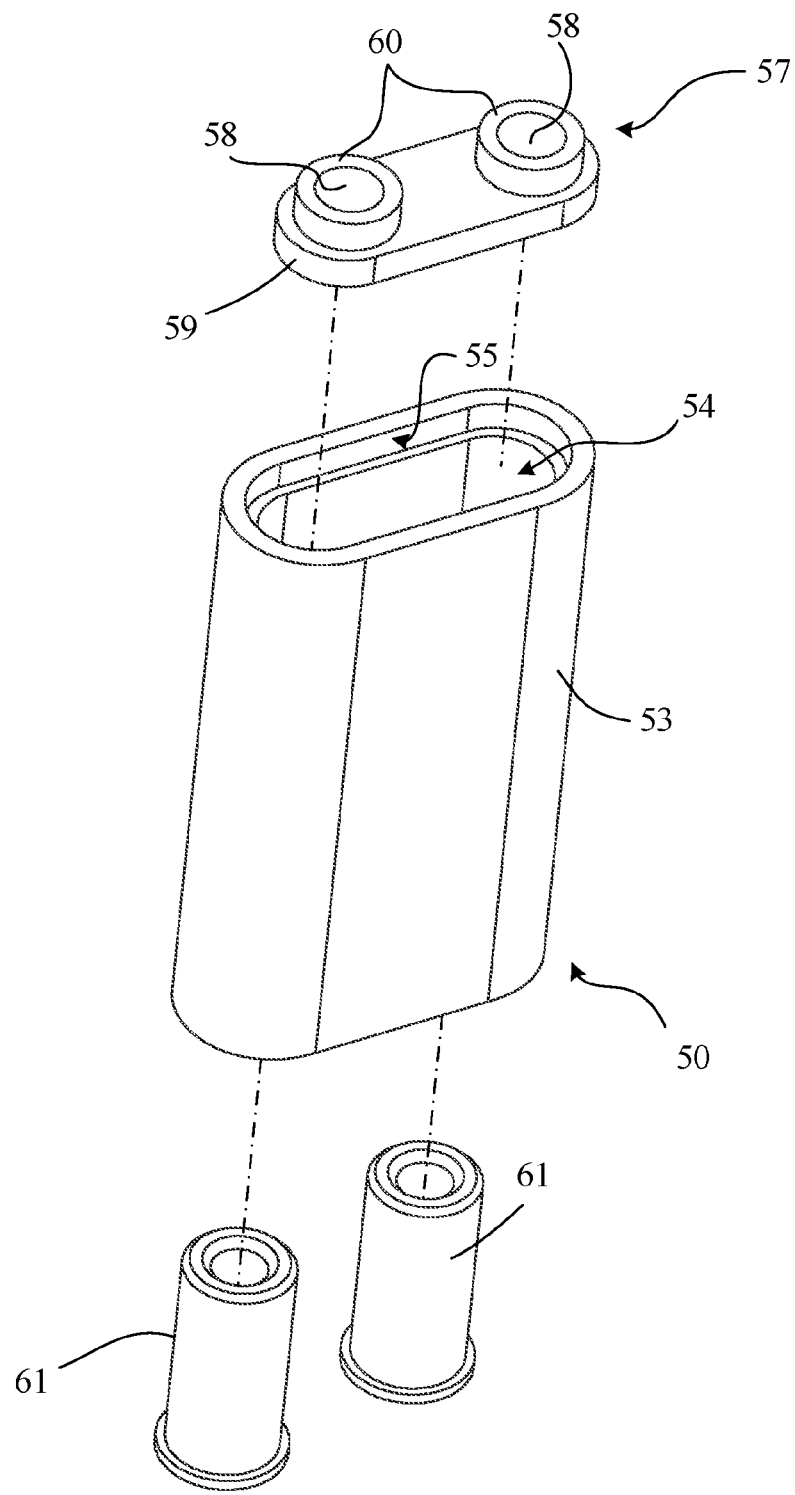
FIG. 9 is a structural schematic diagram of the exploded structure in FIG. 8 at another viewing angle.
Figure 10:
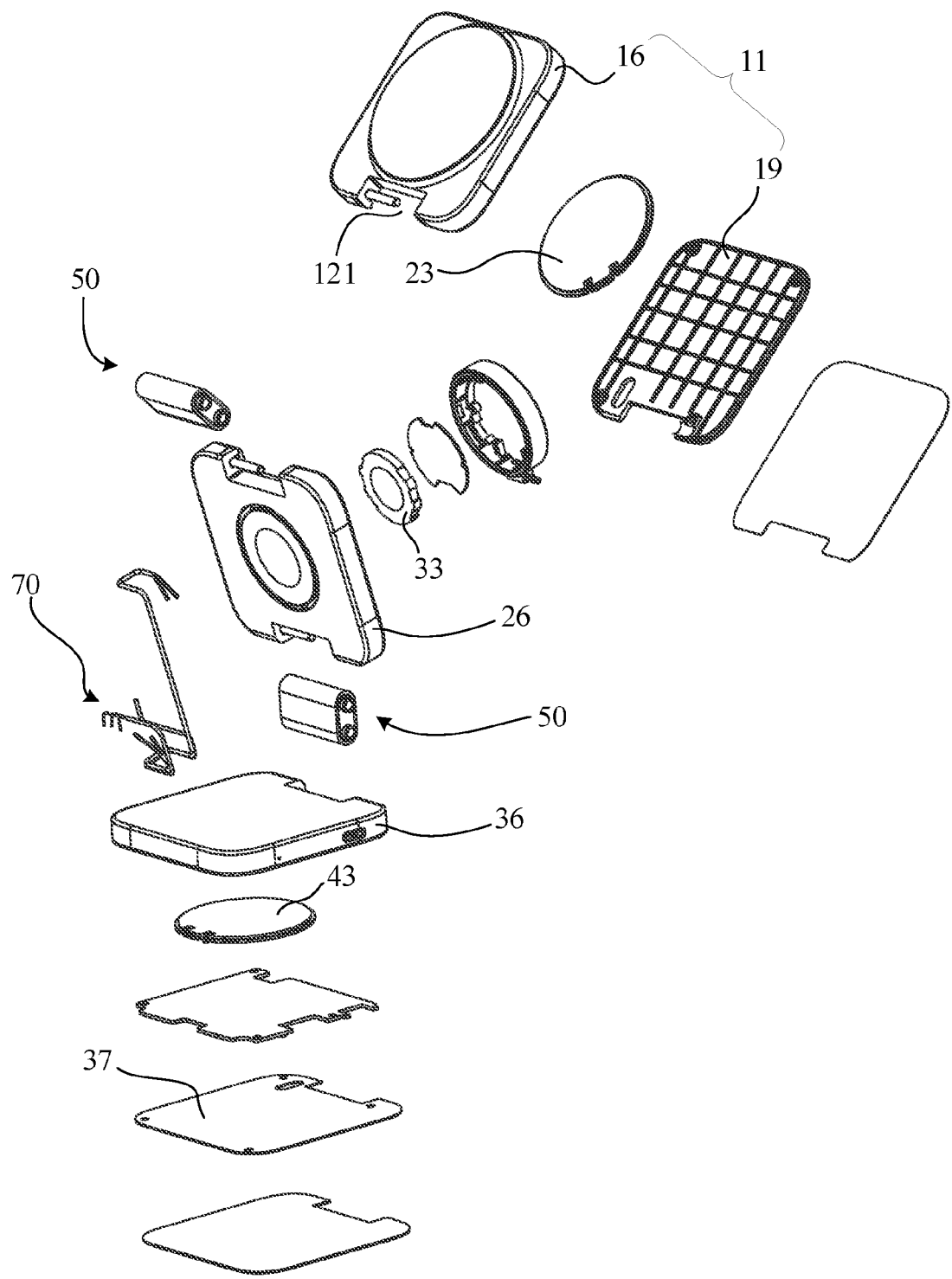
FIG. 10 is a further exploded structural schematic diagram of the foldable holder for a portable electronic device in FIG. 1.
Figure 11:
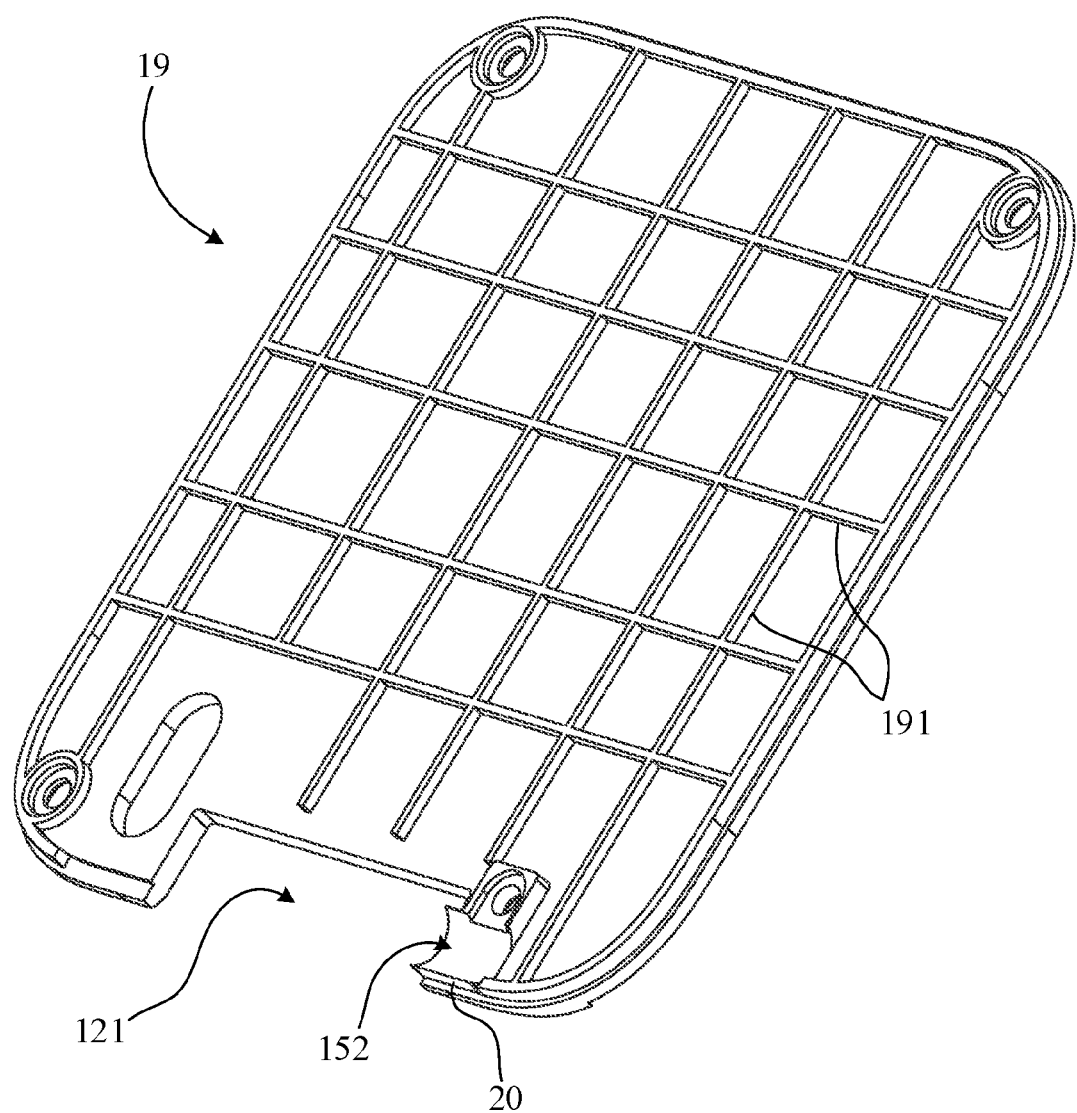
FIG. 11 is an enlarged structural schematic diagram of a bottom cover of an upper support member in FIG. 10.

Further, referring to FIGS. 8 and 9 together, in some embodiments, the first pivot structure 51 includes a first pivot surface 511 and a third pivot surface 512, and the second pivot structure 52 includes a second pivot surface 521 and a fourth pivot surface 522. The first pivot surface 511 and the second pivot surface 521 are disposed on an end of the pivot member 50, and the third pivot surface 512 and the fourth pivot surface 522 are disposed on the other end of the pivot member 50.

The third pivot surface 512 is coaxial with the first pivot surface 511, and the fourth pivot surface 522 is coaxial with the second pivot surface 521; the first pivot surface 511 and the third pivot surface 512 are pivoted to one of the adjacent two plate bodies 11, 25, 35, and the second pivot surface 521 and the fourth pivot surface 522 are pivoted to the other of the adjacent two plate bodies 11, 25, 35.

In the illustrated embodiments, the pivot member 50 is pivoted bilaterally to the plate bodies 11, 25, 35, which allows for a more stable structure and increased reliability or durability of the pivot.

Further, referring to FIGS. 3, 4, and 6 to 10, in some embodiments, the plate body 11, 25, 35 includes a front surface and a back surface that are backed away from each other and a side surface that is disposed between the front surface and the back surface; the side surfaces of each adjacent two of the plate bodies 11, 25, 35 are disposed in close proximity to each other; the side surface of the plate body 11, 25, 35 defines a pivot slot 12, and is formed with a first pivot portion 13 disposed on a side of the pivot slot 12 and a second pivot portion 14 disposed on the other side of the pivot slot 12; the second pivot portion 14 defines a first wire-through hole 15 in communication with an inner cavity of the plate body 11, 25, 35.

In a structure in which the pivot member 50 is pivoted to two adjacent plate bodies 11, 25, 35:

The first pivot surface 511 is pivoted to the first pivot portion 13 of one plate body 11, 25, 35 and the third pivot surface 512 is pivoted to the first wire-through hole 15 of the plate body 11, 25, 35;

The second pivot surface 521 is pivoted to the first pivot portion 13 of the other plate body 11, 25, 35, and the fourth pivot surface 522 is pivoted to the first wire-through hole 15 of the plate body 11, 25, 35.

The pivot member 50 includes a main body 53 and a side cover 57. An end of the main body 53 is arranged with the first pivot surface 511 and the second pivot surface 521, and the other end of the main body 53 defines a wire-through groove 54. The side cover 57 is fixedly capped to the wire-through groove 54, and a side of the side cover 57 back from the main body 53 is arranged with the third pivot surface 512 and the fourth pivot surface 522; a portion on the side cover 57 enclosed by each of the third pivot surface 512 and the fourth pivot surface 522 defines a second wire-through hole 58 in communication with the wire-through groove 54.

The foldable holder 100 for a portable electronic device further includes an electrical connection cable 70, the electrical connection cable 70 being connected to the respective wireless charging devices 23, 33, 43 through the first wire-through hole 15, the wire-through groove 54, and the second wire-through hole 58.

In the embodiments, the pivot member 50 can be accommodated by arranging the pivot slot 12 on the plate body 11, 25, 35, thereby allowing a more compact structure to be formed, such that the pivot member 50 is relatively hidden on an inner side of an outer contour of the foldable holder 100 in the laying support state. In addition, since the pivot connector 50 includes the main body 53 and the side cover 57 as separate structures, when assembling the electrical connection cable 70, the electrical connection cable 70 can be first passed through the two second wire-through holes 58 on the side cover 57, then a part on an inner side of the side cover 57 is embedded in the wire-through groove 54 on the main body 53, and the side cover 57 is fixedly connected to the body 53. In this way, when the pivot member 50 is mounted to the plate bodies 11, 25, 35, the electrical connection cable 70 is introduced into the inner cavities of the two adjacent plate bodies 11, 25, 35 to connect to the respective wireless charging devices 23, 33, 43 and/or the control circuit board(s) therein, due to the fact that the third pivot surface 512 and the fourth pivot surface 522 are pivoted to the first wire-through holes 15 of the two adjacent plate bodies 11, 25, 35.

Further, referring to FIGS. 10 to 16, in some embodiments, the plate body 11, 25, 35 includes a top shell 16, 26, 36, a bottom cover 19, 29, 37, and a pivot seat 20, 30, 40 fixedly disposed on an inner side of the bottom cover 19, 29, 37. The top shell 16, 26, 36 has an opening opened downwardly, and the bottom cover 19, 29, 37 is fixedly capped to the opening of the top shell 16, 26, 36; the pivot slot 12 includes a recess 121 arranged on an edge of the top shell 16, 26, 36, and a notch 122 arranged on an edge of the bottom cover 19, 29, 37; the first wire-through hole 15 includes a first half groove 151 on a side wall of the recess 121, and a second half groove 152 on the pivot seat 20, 30, 40.

In the embodiments, the plate body 11, 25, 35 is provided as a separate structure, which facilitates the mounting of the pivot member 50. For example, when assembling the third pivot surface 512 or the fourth pivot surface 522 with the first wire-through hole 15, it is possible to assemble the two pivot surfaces to the first half grooves 151 on the top shells 16, 26, 36, and then to fit the second half grooves 152 of the two pivot seats 20, 30, 40 to the third pivot surface 512 and the fourth pivot surface 522. On the other hand, the plate bodies 11, 25, 35 being of a separate structure further facilitates the mounting of other components, such as the coils of the wireless charging devices 23, 33, 43 as well as the control circuit board.

Further, referring to FIG. 1, FIG. 6, FIG. 7, FIG. 10, and FIG. 11, in some embodiments, an inner surface of the bottom cover 19 at an upward position in the bent support state is arranged with multiple reinforcing bars 191, and the pivot seat 20 is integrally molded with the bottom cover 19.

In the embodiments, the support member at the upward position is required to bear a larger bending moment, and the structural strength can be increased by arranging the reinforcing bars 191 on the inner surface of the bottom cover 19. Cooperatively, the pivot seat 20 may reduce the number of parts and components, so as to improve the assembly efficiency.

Further, referring to FIG. 1, FIG. 6, FIG. 7, FIG. 10, FIG. 15, and FIG. 16, in some embodiments, the bottom cover 37 at a bottom position in the bent support state is a simple flat plate, and the pivot seat 40 and the bottom cover 37 are of a separate structure.

In the embodiments, the support member 10c at the bottom position is not required to bear an excessive bending moment, therefore, simplifying the structure of the bottom cover 37 is conducive to the use of a common plate and a blanking process for the bottom cover 37, thereby reducing the production cost. Specifically, the bottom cover 37 may be an aluminum plate; the pivot seat 40 and the bottom cover 37 are of a separate structure, thereby facilitating the mounting of relatively complex structures such as curved surfaces on the pivot seat 40 alone; the top shell 36 and the bottom cover 37 form the pivot seat 40 into a clamping structure, thereby forming a good limiting effect.

Figure 4:
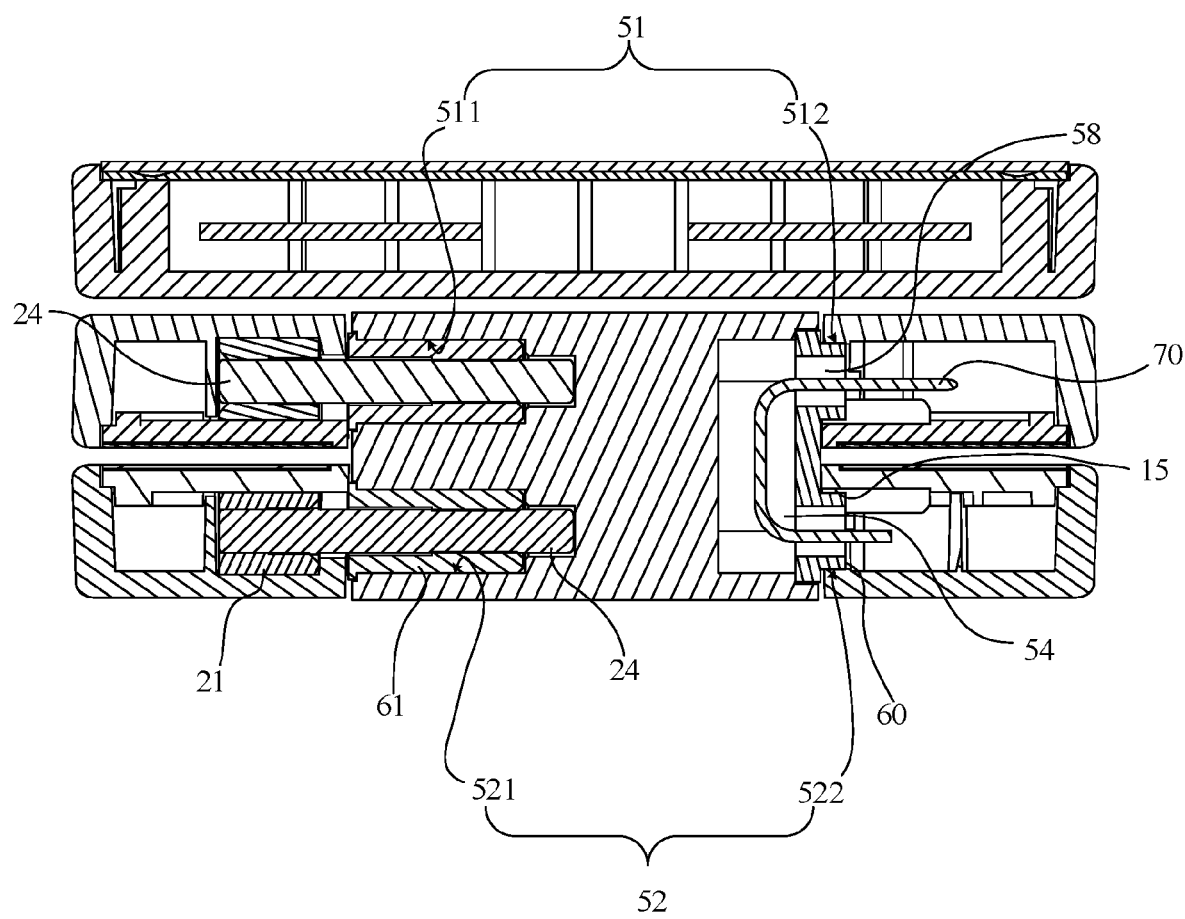
FIG. 4 is a cross-sectional structural schematic diagram along line IV-IV in FIG. 3.
Figure 5:
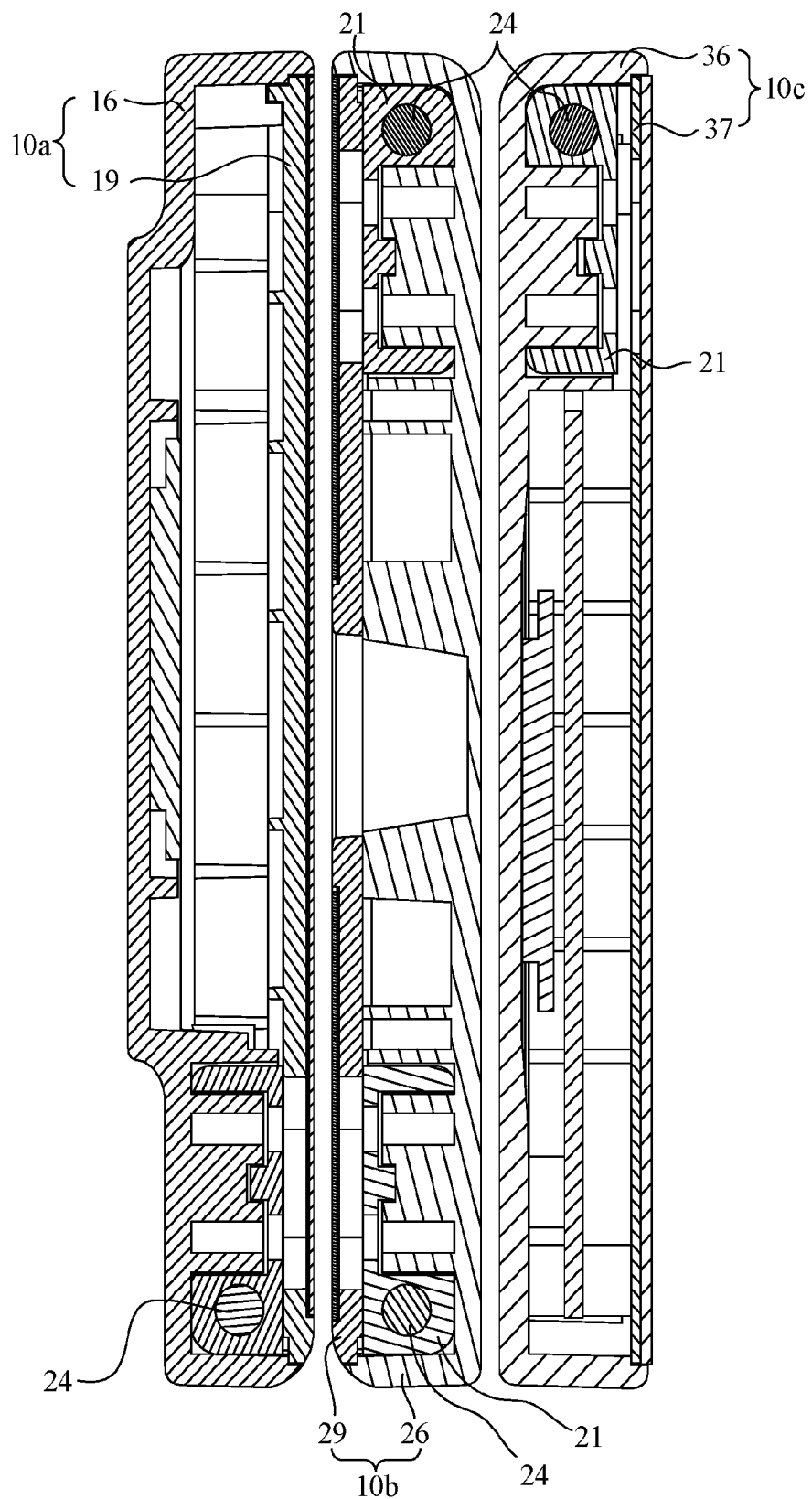
FIG. 5 is a cross-sectional structural schematic diagram along line V-V in FIG. 3.
Figure 6:
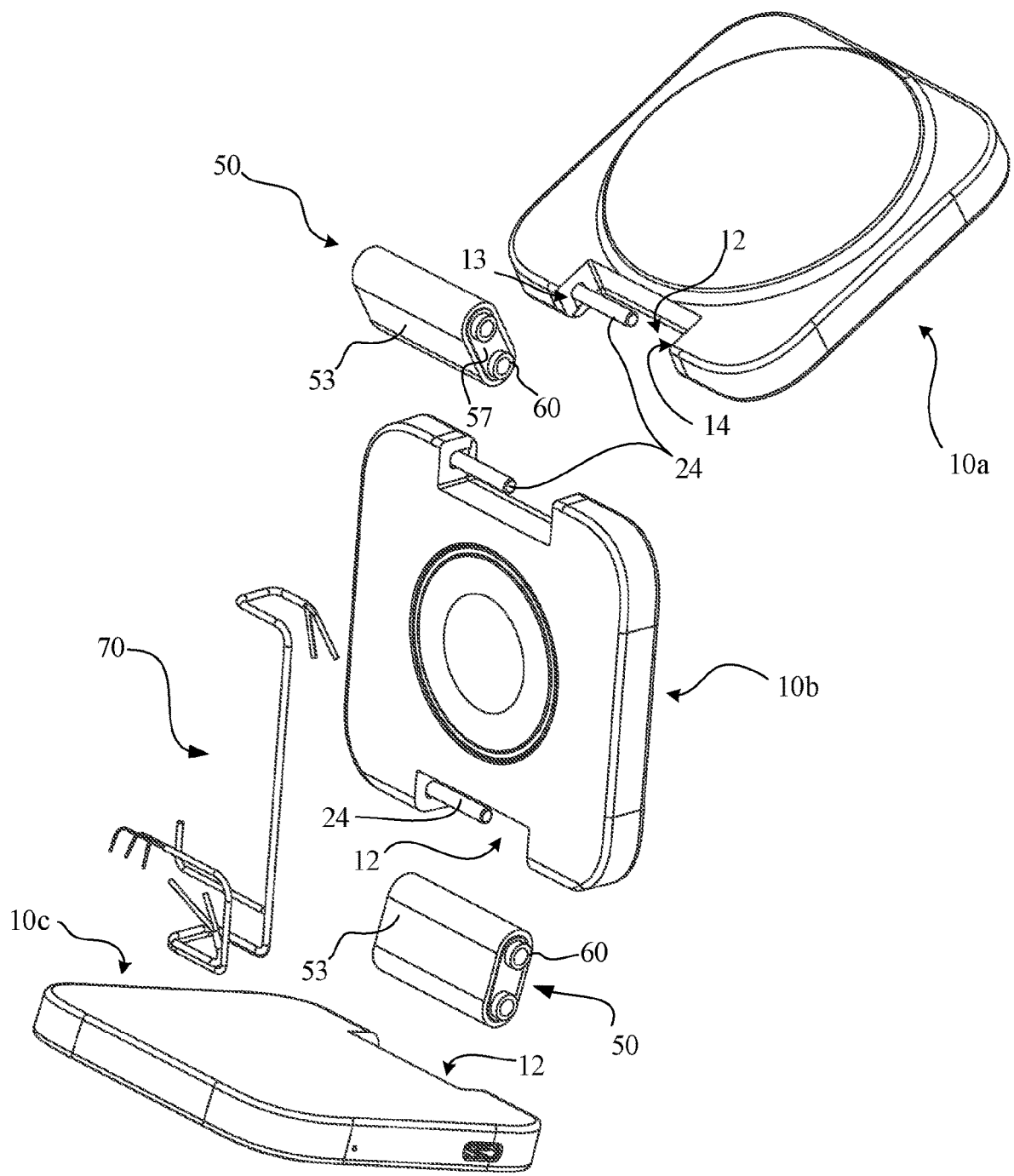
FIG. 6 is an exploded structural schematic diagram of the foldable holder for a portable electronic device in FIG. 1.
Figure 7:
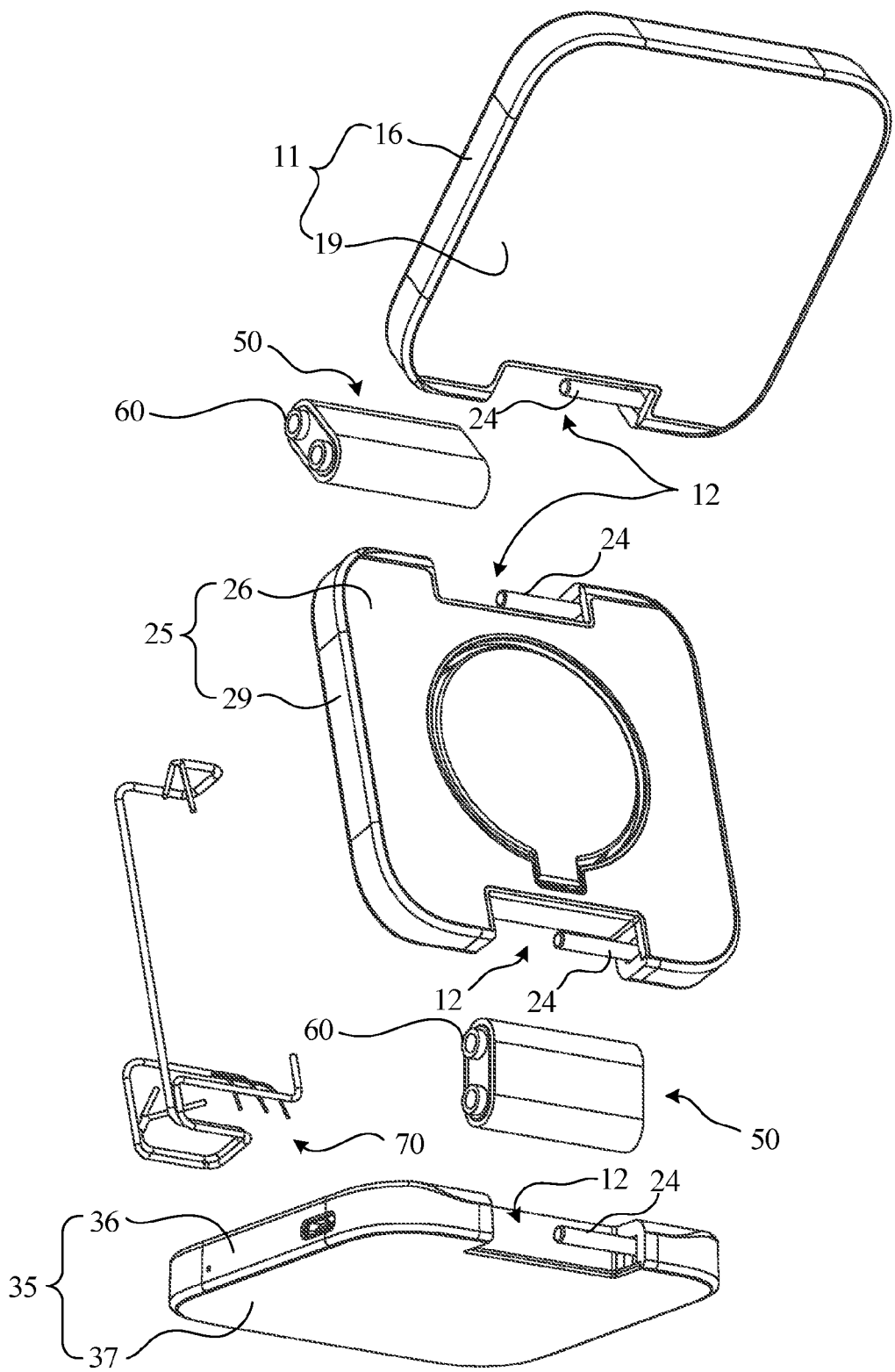
FIG. 7 is a structural schematic diagram of the exploded structure in FIG. 6 at another viewing angle.

Further, referring to FIGS. 4, 8, and 9, in some embodiments, an annular positioning groove 55 is defined at an outer entrance of the wire-through groove 54; the side cover 57 includes a cover plate 59 and two pivoting cylinders 60, the two pivoting cylinders 60 protruding from an outer side of the cover plate 59; and the third pivoting surface 512 and the fourth pivoting surface 522 are each formed on an outer peripheral surface of a corresponding one of the two pivoting cylinders 60. An edge portion of the cover plate 59 is embedded in the positioning groove 55, and the two pivoting cylinders 60 are each pivoted in the first wire-through hole 15 of a corresponding one of two adjacent plate bodies 11, 25, 35.

In the embodiments, the positioning groove 55 is defined for the embedding of the edge portion of the cover plate 59 so as to not only form a stable cavity between the main body 53 and the side cover 57, but also provide a transverse limiting effect for the side cover 57. Further, the pivoting cylinders 60 are arranged to form the third pivoting surface 512 and the fourth pivot surface 522, so as to avoid the pivoting between the pivot member 50 and the plate body 11, 25, 35 from occupying a space inside the pivot member 50 for accommodating the electrical connection cable 70.

Further, referring to FIGS. 4, 6 to 10, and 12 to 16, in some embodiments, the support member 10a, 10b, 10c further includes a pivot shaft 24 extending from the first pivot portion 13 toward the pivot slot 12; two shaft holes 56 are defined on an end of the main body 53 away from the side cover 57, the first pivot surface 511 and the second pivot surface 521 are each formed on an inner wall surface of a corresponding one of the two shaft holes 56, and the two shaft holes 56 are socketed to the pivot shafts 24 of two adjacent support members 10a, 10b, 10c, respectively; the pivot member 50 further includes a damping sleeve 61 socketed on the pivot shaft 24 and disposed between the pivot shaft 24 and a corresponding shaft hole 56; in the bent support state, the support members 10a, 10b, 10c are spread out in the upward and downward directions, and the damping sleeve 61 is configured to make the two support members 10a, 10b, 10c pivoted to each other at a fixed angle.

In the embodiments, the pivot shaft 24 extends into the pivot slot 12 to pivot with the damping sleeve 61 so as to increase a bonding area, thereby generating a greater damping force by means of the damping sleeve 61, such that the foldable holder 100 may maintain a specific angle in the bent support state.

Further, referring to FIG. 10 and FIGS. 12 to 16, the plate body 11, 25, 35 includes a top shell 16, 26, 36, a bottom cover 19, 29, 37 and a limit seat 21.

The top shell 16, 26, 36 has an opening opened downwardly; a side wall of the top shell 16, 26, 36 defines a via 17 opposite to and openly provided with the first wire-through hole 15, and an inner wall surface of the top shell 16, 26, 36 defines a limiting groove 18 in a region adjacent to the via 17.

The bottom cover 19, 29, 37 is fixedly capped to the opening of the top shell 16, 26, 36; the pivot slot 12 defines a recess 121 arranged at an edge of the top shell 16, 26, 36, and a notch 122 arranged at an edge of the bottom cover 19, 29, 37.

The limit seat 21 is fixedly disposed in the limiting groove 18; an end of the limit seat 21 defines a fixing hole 22, the fixing hole 22 being fixedly socketed to an end of the pivot shaft 24 away from the first wire-through hole 15; the limit seat 21 is in the form of an elongate strip, and a length direction of the limit seat 21 is perpendicular to an axis of the pivot shaft 24.

In the embodiments, in a similar way as the mounting of the other end of the pivot member 50, the plate body 11, 25, 35 is set up as a separate structure, such that it can be convenient for the mounting of the limit seat 21, and of course for the mounting of other structures inside the plate body 11, 25, 35. The limit seat 21 extends outwardly along the radial direction of the pivot shaft. In this way, in a case of generating a force arm with the reaction force in a same magnitude, the bonding force between the limit seat 21 and the plate body 11, 25, 35 is less demanding, and thus the assembly between the limit seat 21 and the plate body 11, 25, 35 is less prone to breakage during repeated bending, such that the reliability of the bending is enhanced. In addition, the pivot 24 and the limit seat 21 are of a separate structure, which is favorable for separate processing. For example, the pivot 24 may be formed by wire cutting, and the limit seat 21 may be formed by CNC machining, which comprehensively reduces the production cost.

Figure 12:
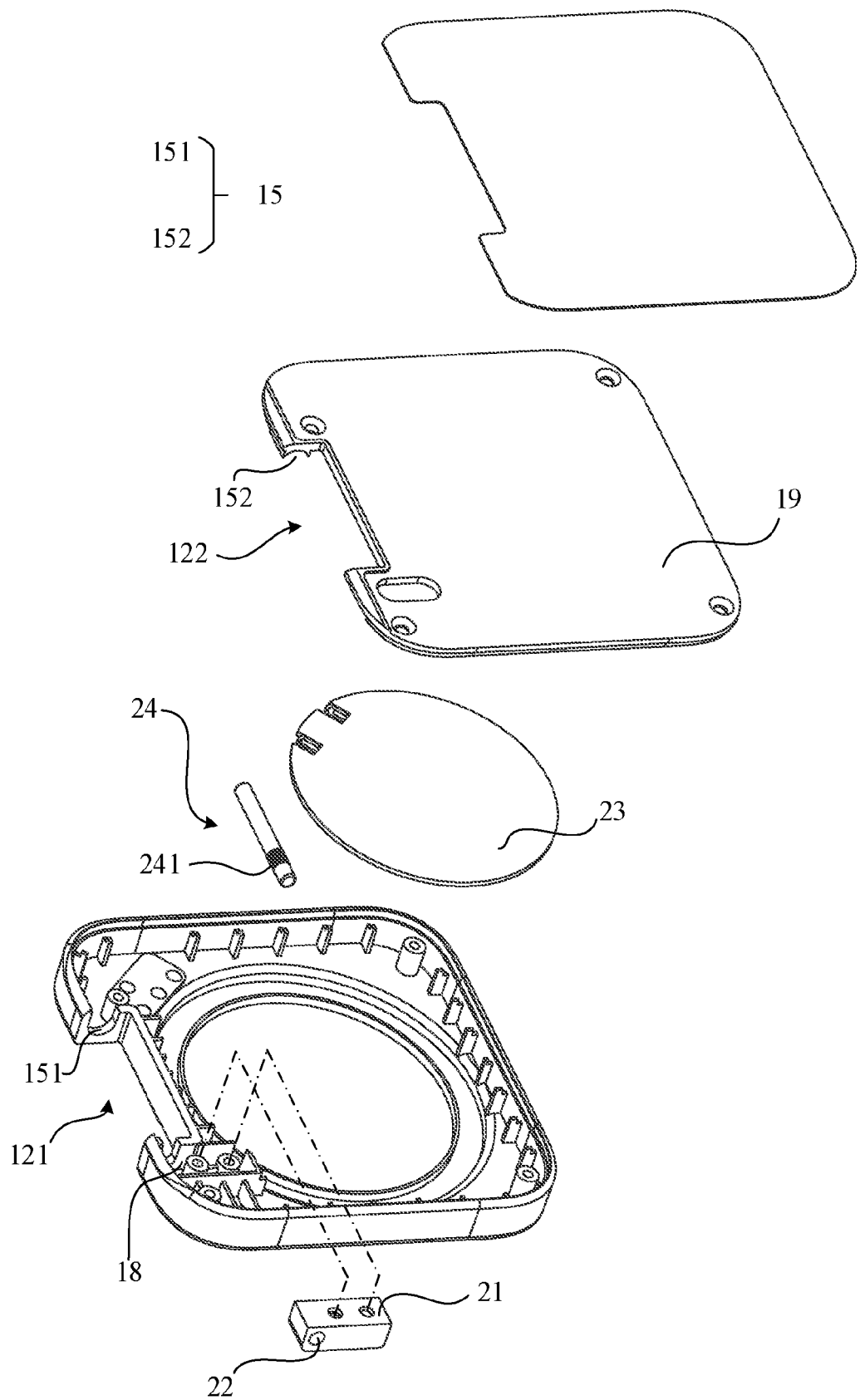
FIG. 12 is an exploded structural schematic diagram of an upper support member in FIG. 1.
Figure 13:
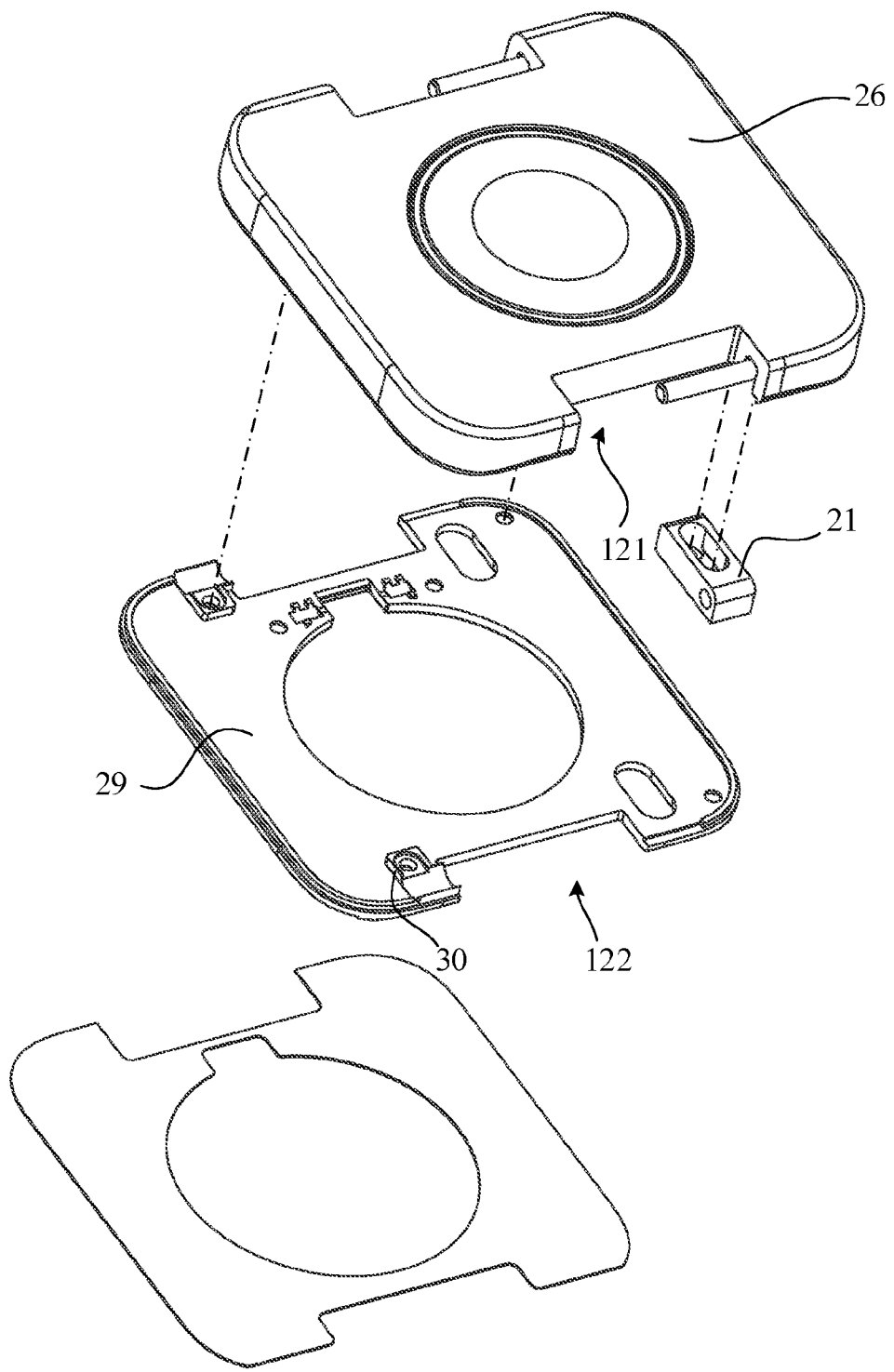
FIG. 13 is an exploded structural schematic diagram of a middle support member in FIG. 1.
Figure 14:
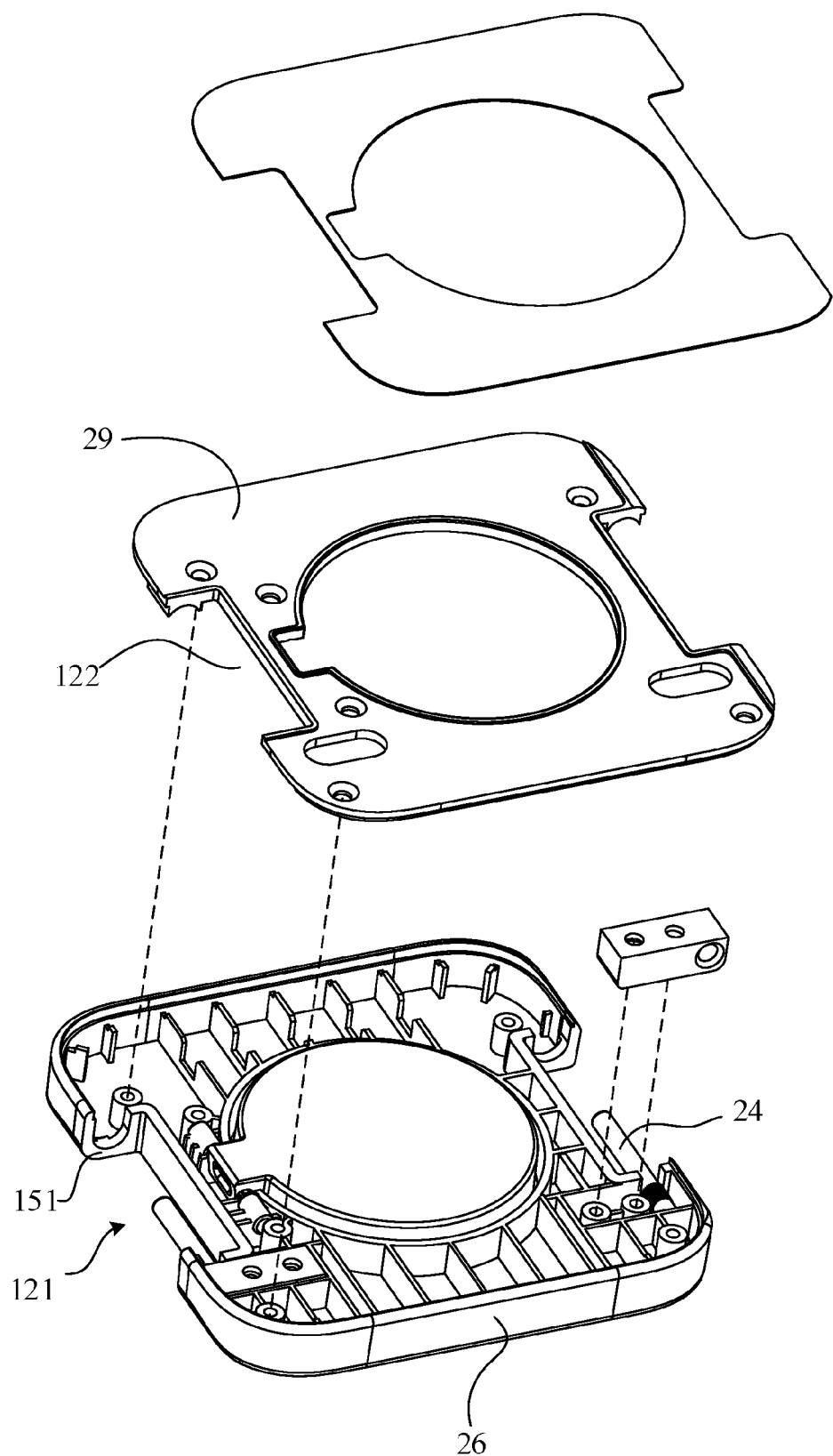
FIG. 14 is a structural schematic diagram of the exploded structure in FIG. 13 at another viewing angle.
Figure 15:
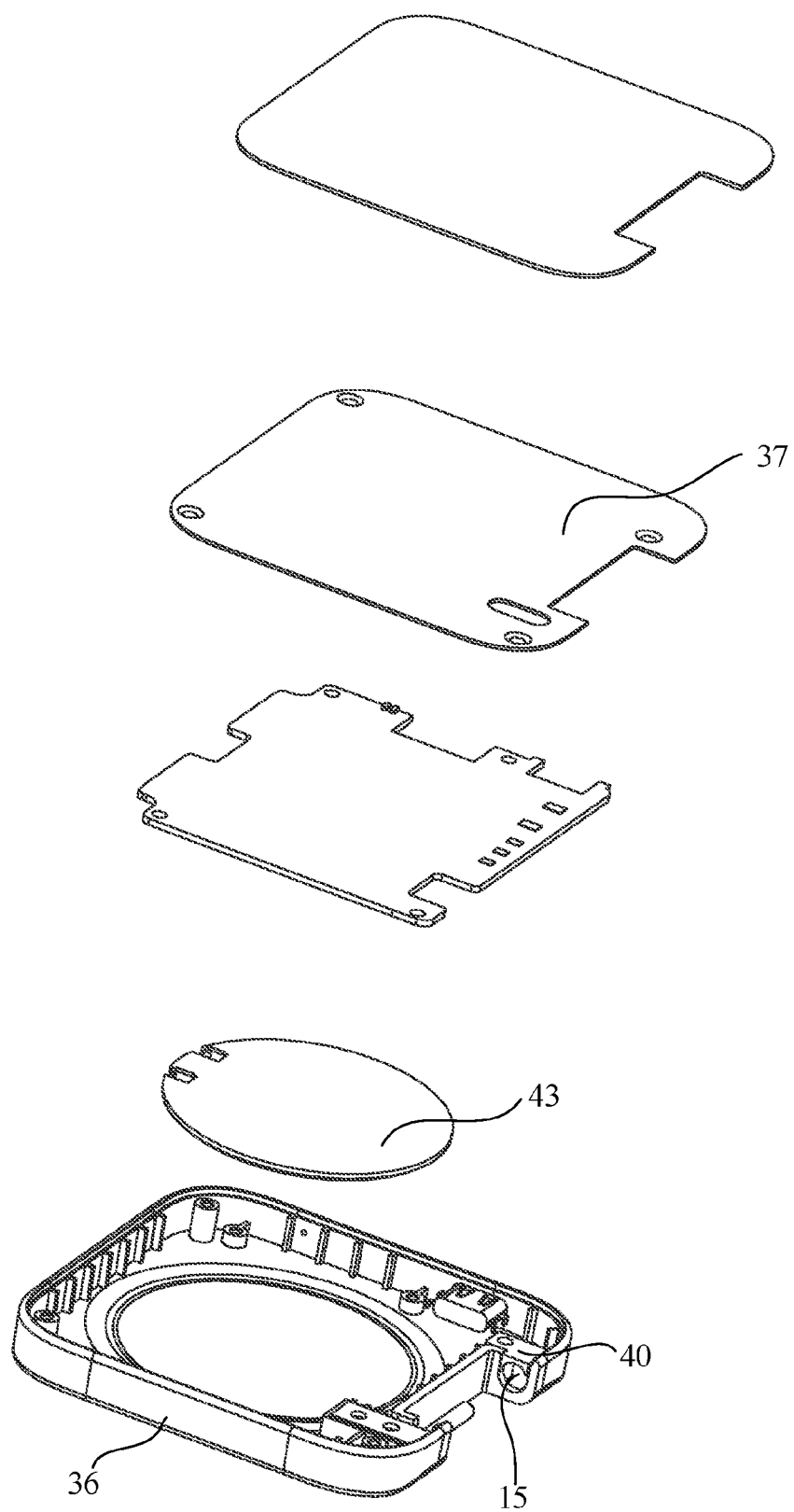
FIG. 15 is an exploded structural schematic diagram of a lower support member in FIG. 1.
Figure 16:
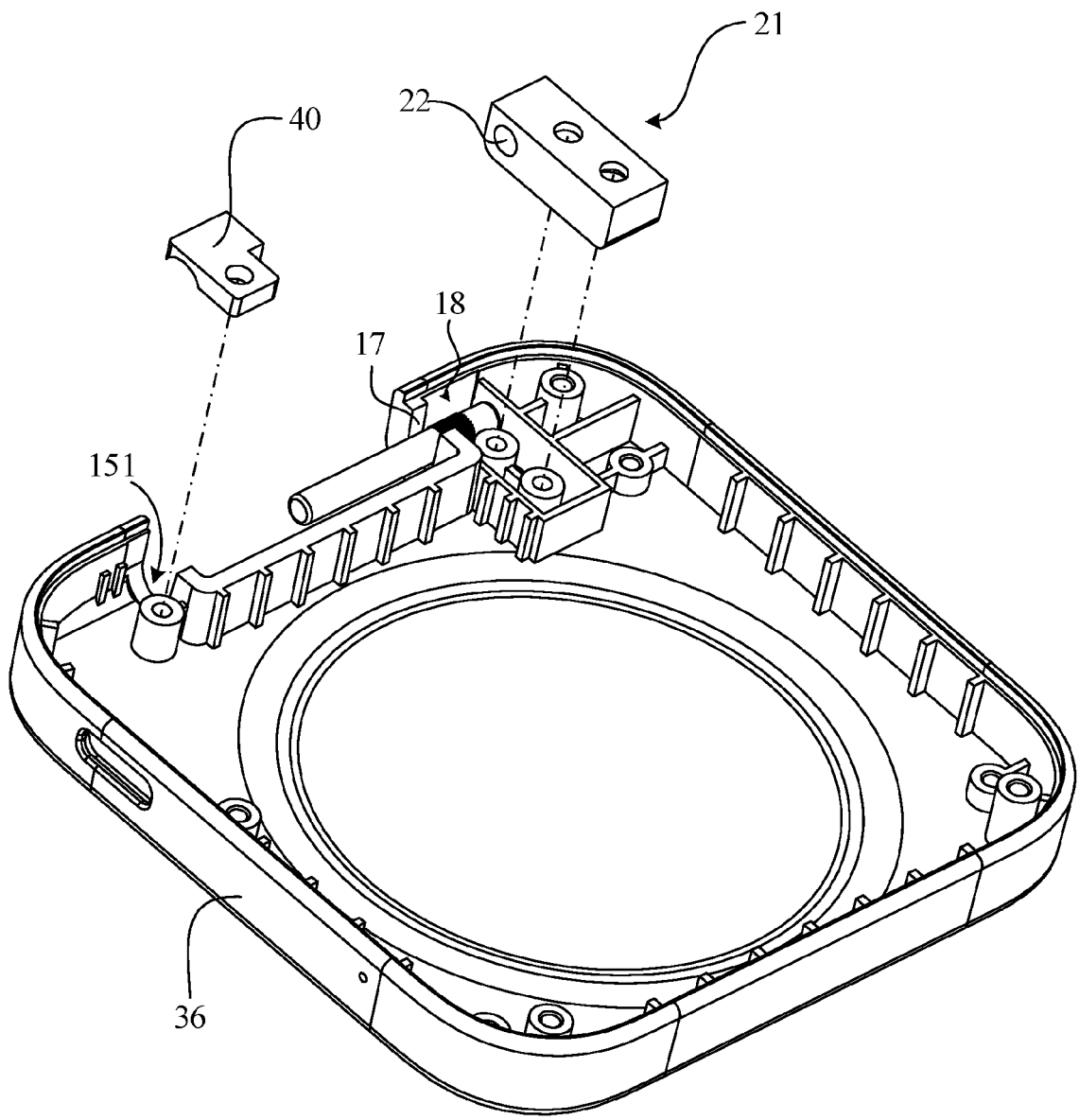
FIG. 16 is an exploded structural schematic diagram of a bottom shell, a pivot seat, a limit seat, and a pivot shaft assembly in FIG. 15.

Further, referring to FIG. 12, an outer peripheral surface of an end of the pivot shaft 24 away from the first wire-through hole 15 is arranged with a friction pattern 241, the friction pattern 241 extends along an axial direction of the pivot shaft 24 and is spaced apart around the axis of the pivot shaft 24; the friction pattern 241 has an interference fit with an inner wall of the fixing hole 22.

In the embodiments, by arranging the friction pattern 241, the fixing between the pivot axis 24 and the limit seat 21 only requires that a part of the pivot shaft arranged with the friction pattern 241 be inserted into the fixing hole 22 of the limit seat 21, and there is no need for an additional gluing or welding process, which is conducive to enhancing the assembly efficiency.

Finally, it should be noted that the above embodiments are only intended to illustrate the technical solutions of the present disclosure, not to limit them; although the present disclosure has been described in detail with reference to the foregoing embodiments, those skilled in the art should understand that it is still possible to modify the technical solutions recorded in the foregoing embodiments, or to replace some of the technical features with equivalent ones. These modifications or replacements do not cause the essence of the technical solutions to depart from the spirit and scope of the technical solutions in the embodiments of the present disclosure.

What is claimed is:

1. A foldable holder for a portable electronic device, comprising a plurality of support members, and a pivot member arranged between each adjacent two of the plurality of support members for pivoting the adjacent two of the plurality of support members;
    wherein each of the plurality of support members comprises a plate body; each of at least two of the plurality of support members further comprises a wireless charging device disposed in a corresponding plate body;
    the pivot member is arranged with a first pivot structure and a second pivot structure, a pivot axis of the first pivot structure being offset with respect to a pivot axis of the second pivot structure; in a structure in which the pivot member is pivoted to adjacent two the plate bodies, the first pivot structure is pivoted to one of the adjacent two plate bodies, and the second pivot structure is pivoted to the other of the adjacent two plate bodies;
    the foldable holder is capable of being in a bent support state or a laying support state; in the bent support state, each adjacent two the plate bodies are arranged at an angle; in the laying support state, all the plate bodies are spliced transversally, wherein upper surfaces of the plate bodies are flush with each other, and lower surfaces of the plate bodies are flush with each other;
    the first pivot structure comprises a first pivot surface and a third pivot surface, and the second pivot structure comprises a second pivot surface and a fourth pivot surface; the first pivot surface and the second pivot surface are disposed on an end of the pivot member, and the third pivot surface and the fourth pivot surface are disposed on another end of the pivot member;
    the third pivot surface is coaxial with the first pivot surface, and the fourth pivot surface is coaxial with the second pivot surface; the first pivot surface and the third pivot surface are pivoted to one of the adjacent two plate bodies, and the second pivot surface and the fourth pivot surface are pivoted to the other of the adjacent two plate bodies;
    the pivot member further comprises a main body and a side cover; an end of the main body is arranged with the first pivot surface and the second pivot surface, and another end of the main body defines a wire-through groove; the side cover is fixedly capped to the wire-through groove, and a side of the side cover back from the main body is arranged with the third pivot surface and the fourth pivot surface.

2. The foldable holder according to claim 1, wherein,
    the plate body comprises a front surface and a back surface that are backed away from each other and a side surface that is disposed between the front surface and the back surface; the side surfaces of each adjacent two the plate bodies are disposed in close proximity to each other; the side surface of the plate body defines a pivot slot, and is formed with a first pivot portion disposed on a side of the pivot slot and a second pivot portion disposed on another side of the pivot slot; the second pivot portion defines a first wire-through hole in communication with an inner cavity of the plate body;
    in the structure in which the pivot member is pivoted to the adjacent two plate bodies:
    the first pivot surface is pivoted to the first pivot portion of one of the adjacent two plate bodies, and the third pivot surface is pivoted to the first wire-through hole of the one of the adjacent two plate bodies; and
    the second pivot surface is pivoted to the first pivot portion of the other of the adjacent two plate bodies, and the fourth pivot surface is pivoted to the first wire-through hole of the other of the adjacent two plate bodies;
    a portion on the side cover enclosed by each of the third pivot surface and the fourth pivot surface defines a second wire-through hole in communication with the wire-through groove;
    the foldable holder further comprises an electrical connection cable, the electrical connection cable being connected to a corresponding wireless charging device through the first wire-through hole, the wire-through groove, and the second wire-through hole.

3. The foldable holder according to claim 2, wherein the plate body further comprises a top shell, a bottom cover, and a pivot seat that is fixedly disposed on an inner side of the bottom cover; the top shell has an opening opened downwardly, and the bottom cover is fixedly capped to the opening of the top shell; the pivot slot comprises a recess arranged on an edge of the top shell, and a notch arranged on an edge of the bottom cover; the first wire-through hole comprises a first half groove on a side wall of the recess, and a second half groove on the pivot seat.

4. The foldable holder according to claim 3, wherein an inner surface of the bottom cover of the plate body at an upward position in the bent support state is arranged with a plurality of reinforcing bars, and the pivot seat is integrally molded with the bottom cover.

5. The foldable holder according to claim 3, wherein the bottom cover of the plate body at a bottom position in the bent support state is a flat plate, and the pivot seat and the bottom cover are of a separate structure.

6. The foldable holder according to claim 2, wherein an annular positioning groove is defined at an outer entrance of the wire-through groove; the side cover comprises a cover plate and two pivoting cylinders, the two pivoting cylinders protruding from an outer side of the cover plate; the second pivoting surface and the fourth pivoting surface are each formed on an outer peripheral surface of a corresponding one of the two pivoting cylinders; an edge portion of the cover plate is embedded in the positioning groove, and the two pivoting cylinders are each pivoted in the first wire-through hole of a corresponding one of the adjacent two plate bodies.

7. The foldable holder according to claim 2, wherein each of the plurality of support members further comprises a pivot shaft extending from the first pivot portion toward the pivot slot; two shaft holes are defined on an end of the main body away from the side cover, the first pivot surface and the third pivot surface are each formed on an inner wall surface of a corresponding one of the two shaft holes, and the two shaft holes are socketed to the pivot shafts of the adjacent two of the plurality of support members, respectively; the pivot member further comprises a damping sleeve socketed on the pivot shaft and disposed between the pivot shaft and a corresponding shaft hole; in the bent support state, the plurality of support members are spread out in an up-down direction, and the damping sleeve is configured to make the adjacent two of the plurality of support members pivoted to each other at a fixed angle.

8. The foldable holder according to claim 7, wherein,
the plate body comprises a top shell, a bottom cover, and a limit seat;
the top shell has an opening opened downwardly; a side wall of the top shell defines a via opposite to and openly provided with the first wire-through hole, and an inner wall surface of the top shell defines a limiting groove in a region adjacent to the via;
the bottom cover is fixedly capped to the opening of the top shell; the pivot slot defines a recess arranged on an edge of the top shell, and a notch arranged on an edge of the bottom cover;
the limit seat is fixedly disposed in the limiting groove; an end of the limit seat defines a fixing hole, the fixing hole being fixedly socketed to an end of the pivot shaft away from the first wire-through hole; the limit seat is in a form of an elongate strip, and a length direction of the limit seat is perpendicular to an axis of the pivot shaft.

9. The foldable holder according to claim 8, wherein an outer peripheral surface of the end of the pivot shaft away from the first wire-through hole is arranged with a friction pattern, and the friction pattern extends along an axial direction of the pivot shaft and is spaced apart around the axis of the pivot shaft; the friction pattern has an interference fit with an inner wall of the fixing hole.

* * * * *